US008780117B2

(12) United States Patent
Ishiguro

(10) Patent No.: US 8,780,117 B2
(45) Date of Patent: Jul. 15, 2014

(54) DISPLAY CONTROL APPARATUS AND DISPLAY CONTROL METHOD CAPABLE OF REARRANGING CHANGED OBJECTS

(75) Inventor: Taisuke Ishiguro, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 943 days.

(21) Appl. No.: 12/165,882

(22) Filed: Jul. 1, 2008

(65) Prior Publication Data

US 2009/0021530 A1 Jan. 22, 2009

(30) Foreign Application Priority Data

Jul. 17, 2007 (JP) ................ 2007-186328

(51) Int. Cl.
*G06T 11/00* (2006.01)
*G09G 5/00* (2006.01)
*G06T 11/20* (2006.01)
*G06T 11/60* (2006.01)
*G06F 17/21* (2006.01)
*G09G 5/24* (2006.01)

(52) U.S. Cl.
CPC ............. *G06T 11/203* (2013.01); *G06T 11/60* (2013.01); *G06F 17/211* (2013.01); *G06F 17/214* (2013.01); *G09G 5/24* (2013.01)
USPC ........ 345/467; 345/468; 345/469; 345/469.1; 345/660; 345/440; 345/441; 345/168; 345/173; 715/209; 715/235; 715/788

(58) Field of Classification Search
CPC ...... G06T 11/60; G06T 11/203; G06F 17/211
USPC ................. 345/441, 173, 660, 467, 468, 469, 345/469.1; 715/209, 235, 517
See application file for complete search history.

(56) References Cited

U.S. PATENT DOCUMENTS 5,596,350 A * 1/1997 Capps et al. ............. 345/173
(Continued)

FOREIGN PATENT DOCUMENTS

| JP | 6-231308 | 8/1994 |
| JP | 7-182449 | 7/1995 |

OTHER PUBLICATIONS

"How to Enlarge and Reduce an Image Object by Mouse Drag", http://topic.csdn.net/t/20030414/10/1657042.html (Apr. 14, 2003).

(Continued)

*Primary Examiner* — Jin-Cheng Wang
(74) *Attorney, Agent, or Firm* — Fitzpatrick, Cella, Harper & Scinto

(57) ABSTRACT

A display control apparatus controls display on a display screen and includes an area designation unit configured to designate an area on the display screen, and an extraction unit configured to extract images of objects displayed in the area designated by the area designation unit and to calculate circumscribed rectangular areas circumscribing the respective objects. In addition, a changing unit is configured to, when a first shape of the area designated by the area designation unit changes to a different second shape and at least one of the circumscribed rectangular areas initially falling within the first shaped area is determined not to fall within the second shaped area even if an arrangement change of the respective objects is executed, change the size of the images of the respective objects or spacing between adjacent circumscribed rectangular areas so as to make all of the circumscribed rectangular areas fall within the second shaped area, and execute the arrangement change of the respective changed objects. A display unit displays the images of the respective changed objects after the arrangement change executed by the changing unit.

8 Claims, 14 Drawing Sheets

(56) References Cited

U.S. PATENT DOCUMENTS

| | | | | |
|---|---|---|---|---|
| 5,671,438 | A | * | 9/1997 | Capps et al. ............ 715/234 |
| 6,021,218 | A | * | 2/2000 | Capps et al. ............ 382/187 |
| 6,032,163 | A | * | 2/2000 | Tou et al. ............... 715/235 |
| 7,120,872 | B2 | * | 10/2006 | Thacker ................. 715/209 |
| 7,205,985 | B2 | * | 4/2007 | Dodge et al. ........... 345/179 |
| 7,574,048 | B2 | * | 8/2009 | Shilman et al. ......... 382/187 |
| 7,904,810 | B2 | * | 3/2011 | Chen et al. ............. 715/268 |
| 2002/0154146 | A1 | * | 10/2002 | Rodriquez et al. ..... 345/660 |
| 2003/0014445 | A1 | * | 1/2003 | Formanek et al. ..... 707/526 |
| 2003/0179201 | A1 | * | 9/2003 | Thacker ................. 345/441 |
| 2004/0146199 | A1 | * | 7/2004 | Berkner et al. ......... 382/176 |
| 2004/0202352 | A1 | * | 10/2004 | Jones et al. ............. 382/114 |
| 2005/0188303 | A1 | * | 8/2005 | Ayers et al. ............ 715/517 |
| 2006/0224610 | A1 | * | 10/2006 | Wakeam et al. ....... 707/101 |
| 2007/0234203 | A1 | * | 10/2007 | Shagam et al. ......... 715/517 |

OTHER PUBLICATIONS

Chinese Office Action dated May 12, 2010, in related corresponding Chinese Patent Appln. No. 200810130765.1 (with English translation).

* cited by examiner

FIG. 9A

| ARRANGEMENT AREA 901 | | | | CURRENT COORDINATES 902 | | LINE WIDTH 903 | LINE SPACING 904 | CHARACTER SPACING 905 |
|---|---|---|---|---|---|---|---|---|
| x1 | y1 | x2 | y2 | x | y | | | |
| 300 | 320 | 460 | 500 | 300 | 400 | 40 | 1.0 | 1.0 |

FIG. 9B

| ARRANGEMENT AREA | | | | CURRENT COORDINATES | | LINE WIDTH | LINE SPACING | CHARACTER SPACING |
|---|---|---|---|---|---|---|---|---|
| x1 | y1 | x2 | y2 | x | y | | | |
| 300 | 320 | 460 | 500 | 330 | 400 | 40 | 1.0 | 1.0 |

FIG. 9C

| ARRANGEMENT AREA | | | | CURRENT COORDINATES | | LINE WIDTH | LINE SPACING | CHARACTER SPACING |
|---|---|---|---|---|---|---|---|---|
| x1 | y1 | x2 | y2 | x | y | | | |
| 300 | 320 | 460 | 500 | 300 | 440 | 40 | 1.0 | 1.0 |

FIG. 13A

| PRIORITY | CHANGE ITEM | CHANGE RATE | CURRENT VALUE | MINIMUM VALUE |
|---|---|---|---|---|
| 1 | CHARACTER IMAGE | 2% | 100% | 50% |
| 2 | LINE SPACING | 2% | 100% | 80% |
| 3 | CHARACTER SPACING | 2% | 100% | 85% |

| PRIORITY | CHANGE ITEM | CHANGE RATE | CURRENT VALUE | MINIMUM VALUE |
|---|---|---|---|---|
| 1 | CHARACTER IMAGE | 2% | 98% | 50% |
| 2 | LINE SPACING | 2% | 100% | 80% |
| 3 | CHARACTER SPACING | 2% | 100% | 85% |

FIG. 14

| INPUT CHARACTER | CHARACTER WIDTH | CHARACTER HEIGHT | CHARACTER POSITION ||||  CHARACTER IMAGE INFORMATION |
|---|---|---|---|---|---|---|---|
| | | | x1 | y1 | x2 | y2 | |
| I | 30 | 40 | 300 | 400 | 330 | 440 | .... |
| T | 30 | 60 | 330 | 400 | 360 | 460 | .... |
| A | 35 | 50 | 360 | 390 | 395 | 440 | .... |
| L | 30 | 40 | ... | ... | ... | ... | ..... |
| I | 30 | 40 | ... | ... | ... | ... | ..... |
| A | ... | ... | ... | ... | ... | ... | ..... |
| N | ... | ... | ... | ... | ... | ... | ..... |
| R | ... | ... | ... | ... | ... | ... | ..... |
| E | ... | ... | ... | ... | ... | ... | ..... |
| S | ... | ... | ... | ... | ... | ... | ..... |

1401, 1402, 1403, 1404, 1405

CHARACTER STRING STRUCTURE INFORMATION

FIG. 15

| ITEM | VALUE |
|---|---|
| LINE SPACING | 1.0 |
| CHARACTER SPACING | 1.0 |

1501, 1502

DISPLAY CONTROL APPARATUS AND DISPLAY CONTROL METHOD CAPABLE OF REARRANGING CHANGED OBJECTS

BACKGROUND OF THE INVENTION

1. Field of the Invention

The present invention relates to a display control apparatus and display control method for controlling display on the display screen.

2. Description of the Related Art

A technique of arranging a character expressed by font data in an arbitrary area on the display screen has been conventionally known and is generally used in a document creation application and the like.

These days, an automatic edit function called variable printing has also been proposed. The automatic edit function can arrange a designated character string in a predetermined area in accordance with the size and shape of the area. More specifically, the automatic edit function automatically calculates the arrangement and size of characters, the spacing between the characters of the character string, the line spacing, and the like based on the size and shape of the area.

The automatic edit function is also applied to the document creation application. More specifically, the document creation application has a function of creating an area for arranging a character string. Even when the shape of the area changes, the arrangement of a character string can be automatically adjusted in accordance with the changed shape.

The automatic edit function generally targets a character string expressed by font data, and cannot be used for handwritten characters, figures, and the like having no font data.

In general, an automatic edit function implemented for handwritten characters, figures, and the like is limited. For example, Japanese Patent Laid-Open Nos. 6-231308 and 7-182449 disclose only a function of changing the position and size of a handwritten character.

To use the automatic edit function, the user needs to recognize a handwritten character or the like using a character recognition means or the like, and convert the recognized character into font data.

However, if no handwritten character can be accurately recognized when trying to use the automatic edit function by recognizing a handwritten character, figure, or the like, no character can be accurately displayed on the display screen. In addition, no automatic edit function can be used at all for an object which cannot be recognized as font data, such as a handwritten figure or the like other than a character.

SUMMARY OF THE INVENTION

The present invention has been made to overcome the conventional drawbacks

A display control apparatus according to the present invention comprises the following arrangement. That is, a display control apparatus which controls display on a display screen, comprising:

an area designation unit configured to designate an area on the display screen;

an extraction unit configured to extract images of objects displayed in the area designated by the area designation unit, and calculating circumscribed rectangular areas circumscribing the respective objects;

a calculation unit configured to, when a shape of the area designated by the area designation unit changes and the circumscribed rectangular areas calculated by the extraction unit are determined not to fall within the shape-changed area, determine an arrangement of the circumscribed rectangular areas so as to make the circumscribed rectangular areas fall within the shape-changed area, and calculate positions of the circumscribed rectangular areas; and a display unit configured to display the images of the objects at the positions calculated by the calculation unit.

A display control method according to the present invention comprises the following steps. That is, a display control method in a display control apparatus which controls display on a display screen, comprising:

an area designation step of designating an area on the display screen;

an extraction step of extracting images of objects displayed in the area designated in the area designation step, and calculating circumscribed rectangular areas circumscribing the respective objects;

a calculation step of, when a shape of the area designated in the area designation step changes and the circumscribed rectangular areas calculated in the extraction step are determined not to fall within the shape-changed area, determining an arrangement of the circumscribed rectangular areas so as to make the circumscribed rectangular areas fall within the shape-changed area, and calculating positions of the circumscribed rectangular areas; and a display step of displaying the images of the objects at the positions calculated in the calculation step.

The present invention can automatically edit a handwritten object displayed in a predetermined area on the display screen in synchronism with the size and shape of the area.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 9A to 9C are tables showing an example of a temporary data table which saves information on a stroke data arrangement area;

FIGS. 13A and 13B are tables showing an example of a change rule table;

FIG. 14 is a table showing an example of an input object list; and

FIG. 15 is a table showing an example of a position rule table.

DESCRIPTION OF THE EMBODIMENTS

Preferred embodiments of the present invention will now be described in detail in accordance with the accompanying drawings.

In the following description, a "stroke data arrangement area" is the area of a designated object to be edited among handwritten objects displayed on the display screen displayed by stroke input. A "temporary data table" is a table in which the coordinates of a designated stroke data arrangement area are registered. An "input object list" is a list in which information (character image information and character string structure information) on an object contained in the stroke data arrangement area is registered.

A "position rule table" is a table which defines a rule (line spacing, character spacing, and the like) about the position of an object when the arrangement of an object in the stroke data arrangement area changes upon changing the shape of the stroke data arrangement area. A "change rule table" is a table which defines a rule (priority and the contents of a change) when the size of an object in the stroke data arrangement area or the spacing between objects changes upon changing the shape of the stroke data arrangement area.

First Embodiment

1. Configuration of Network System

Figure 1:
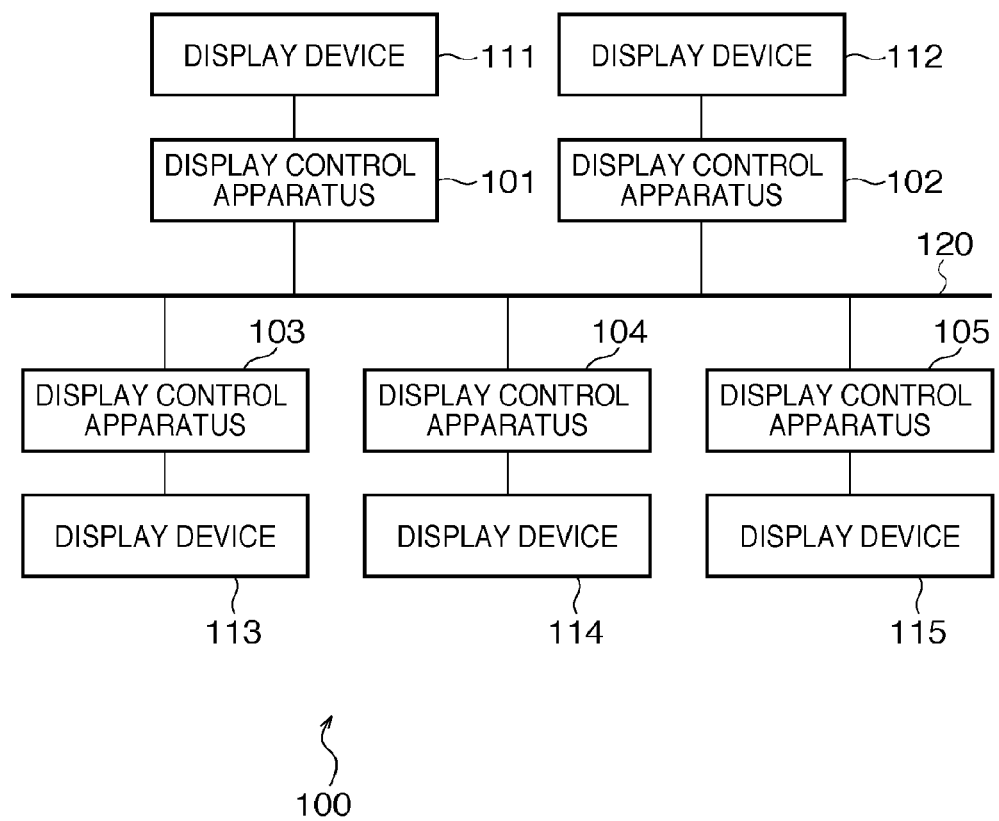
FIG. 1 is a block diagram showing a network system having a display control apparatus according to the first embodiment of the present invention.

FIG. 1 is a block diagram showing a network system having a display control apparatus according to the first embodiment of the present invention. A network system 100 is configured by connecting display control apparatuses 101 to 105 to a network 120 serving as a transmission medium for various pieces of information. The network 120 is, for example, a LAN (Local Area Network) such as Ethernet®, or a wide area information communication network such as the Internet.

The display control apparatuses 101 to 105 are connected to the network 120 via network I/Fs 207 to be described later with reference to FIG. 2. The display control apparatuses 101 to 105 are respectively connected to display devices 111 to 115 via display device I/Fs 205.

The display control apparatuses 101 to 105 have the same arrangement, and thus the display control apparatus 101 will be described in detail below.

2. Hardware Configuration of Display Control Apparatus 101

Figure 2:
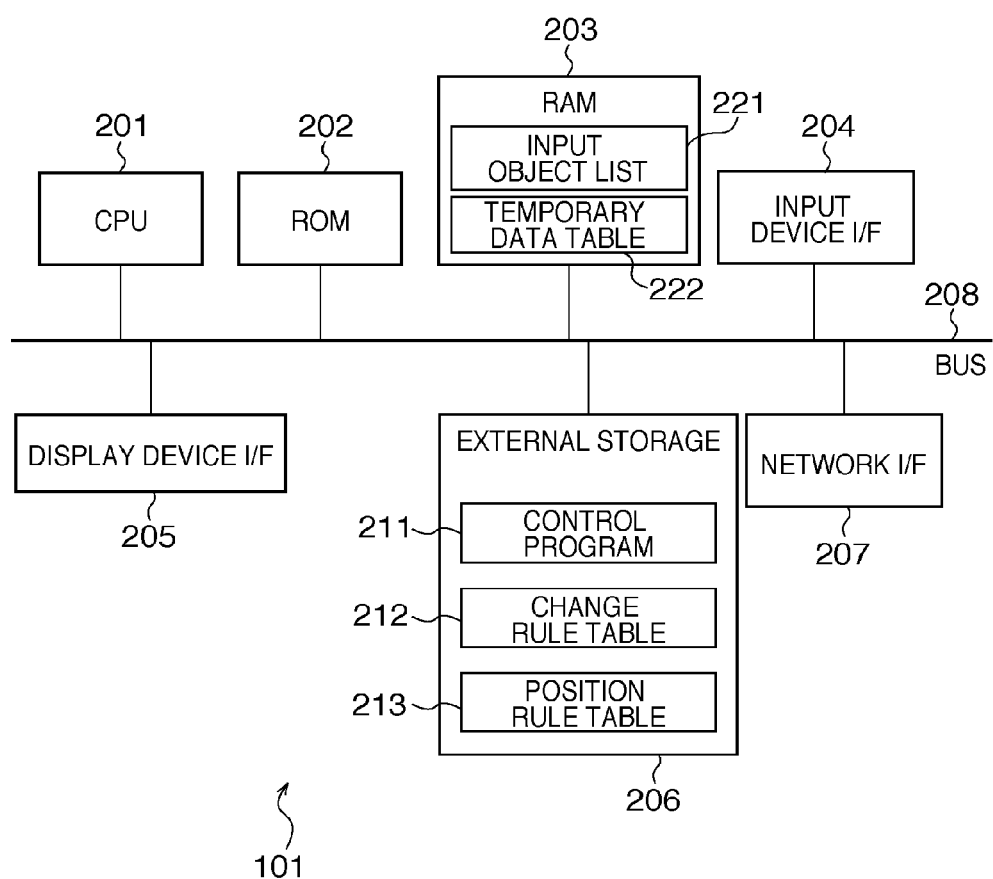
FIG. 2 is a block diagram showing the hardware configuration of a display control apparatus 101.

FIG. 2 is a block diagram showing the hardware configuration of the display control apparatus 101. In FIG. 2, a CPU 201 performs calculation, logical determination, and the like for a variety of processes, and controls building elements 202 to 207 connected via a bus 208.

The ROM (Read Only Memory) 202 stores various control programs executed by the CPU 201.

The RAM (Random Access Memory) 203 is used as a temporary storage for various pieces of information (e.g., an input object list 221 and temporary data table 222 to be described later) transmitted from building elements.

The input device I/F 204 is connected to input devices (not shown) such as a mouse and keyboard, and accepts instructions input via these input devices.

The display device I/F 205 is used to connect the display device 111 having an image display function made up of a cathode-ray tube CRT, liquid crystal panel, and the like, and a digitizer function of detecting position information indicated with a pointing device such as a digitizer pen.

An image to be displayed on the display device 111 is transmitted to the display device 111 via the display device I/F 205. Position information detected by the digitizer function of the display device 111 is received via the display device I/F 205.

The external storage 206 stores a control program 211 for implementing a display control method according to the first embodiment of the present invention, and tables (e.g., a change rule table 212 and position rule table 213 to be described later) used to execute the control program 211. In other words, the external storage 206 functions as a change rule holding means and position rule holding means. In addition, the external storage 206 stores drivers (not shown) and the like for operating various devices (input device, display device, and the like).

As a storage medium for storing these pieces of information, a ROM, floppy® disk, CD-ROM, DVD-ROM, memory card, magneto-optical disk, and the like are available.

The network I/F 207 is connected to the network 120, and can communicate with the remaining display control apparatuses 102 to 105 in the network system 100.

The display control apparatus 101 having these building elements 201 to 207 operates in response to a predetermined instruction accepted by the input device I/F 204 or a predetermined instruction input from the network I/F 207 via the network 120. When a predetermined instruction is input via the input device I/F 204 or network I/F 207, an interrupt signal is transmitted to the CPU 201, and the CPU 201 reads out the control program 211 stored in the external storage 206. The CPU 201 executes the control program 211 to implement the display control method according to the first embodiment.

In the above description, the external storage 206 stores the control program 211 and the tables (the change rule table 212 and position rule table 213) for implementing the display control method according to the first embodiment, but the present invention is not limited to this. For example, the display control method may also be executed by supplying a storage medium storing the control program 211 and the like to the network system 100 or display control apparatus 101, and reading out the control program 211 and the like from the storage medium by the computer of the display control apparatus 101.

3. Functional Configuration of Display Control Apparatus 101

Figure 3:
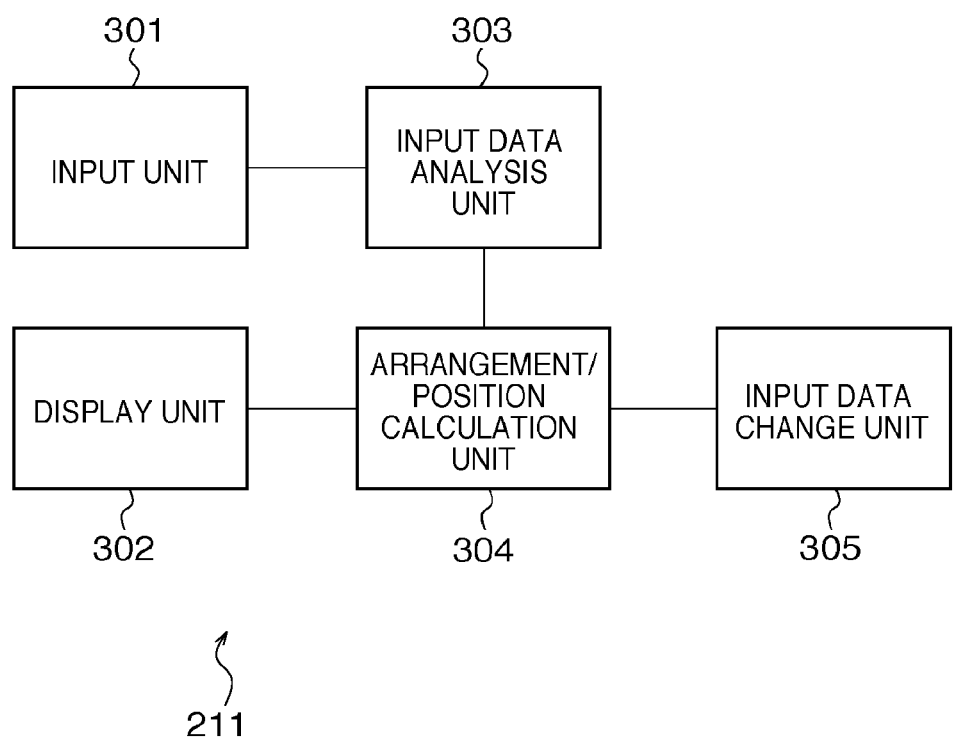
FIG. 3 is a functional block diagram showing functions implemented by executing a control program 211 of the display control apparatus 101.

FIG. 3 is a functional block diagram showing functions obtained by executing the control program 211 of the display control apparatus 101. As shown in FIG. 3, the display control apparatus 101 executes the control program 211 to obtain the functions of an input unit 301, display unit 302, input data analysis unit 303, arrangement/position calculation unit 304, and input data change unit 305.

The input unit 301 accepts, via the display device I/F 205, stroke input information (specifically, position information) input by designating a position on the display screen of the display device 111 by the operator with a pointing device such as a digitizer pen. The input unit 301 accepts, via the input device I/F 204, information such as a stroke data arrangement area change instruction input by the operator with an input device.

The display unit 302 generates an image based on the result of edit processing based on the input stroke input information and stroke data arrangement area change instruction, and displays the image on the display device 111 via the display device I/F 205.

The input data analysis unit 303 extracts the image of a handwritten character (object) generated based on the stroke input information accepted by the input unit 301, and creates character image information. The input data analysis unit 303 recognizes characters contained in a series of created character image information as a character string, and creates character string structure information. The created character image information and character string structure information are registered as the input object list 221 in the RAM 203.

The arrangement/position calculation unit 304 determines the arrangement of a calculated circumscribed rectangular area so that the calculated circumscribed rectangular area falls within a changed stroke data arrangement area designated by a stroke data arrangement area change instruction accepted by the input unit 301. The arrangement/position calculation unit 304 calculates the position of the circumscribed rectangular area in the determined arrangement. The position of the circumscribed rectangular area is calculated using the input object list 221 and position rule table 213.

When a changed stroke data arrangement area is small and it is determined that all circumscribed rectangular areas containing handwritten character images in a stroke data arrangement area before change cannot be arranged, the arrangement/position calculation unit 304 notifies the input data change unit 305 that an overflow has occurred.

Upon receiving the overflow notification from the arrangement/position calculation unit 304, the input data change unit 305 changes values in the input object list 221 based on the change rule table 212.

4. Arrangement and Operation Procedures of Display Screen

The arrangement of a display screen capable of inputting a stroke with a digitizer pen and automatically editing a handwritten character obtained by the stroke input by designating a stroke data arrangement area will be explained with reference to FIGS. 4A to 4C. In addition, the procedures of an edit operation by the operator to a display screen 400 will be simply described.

Figure 4A:
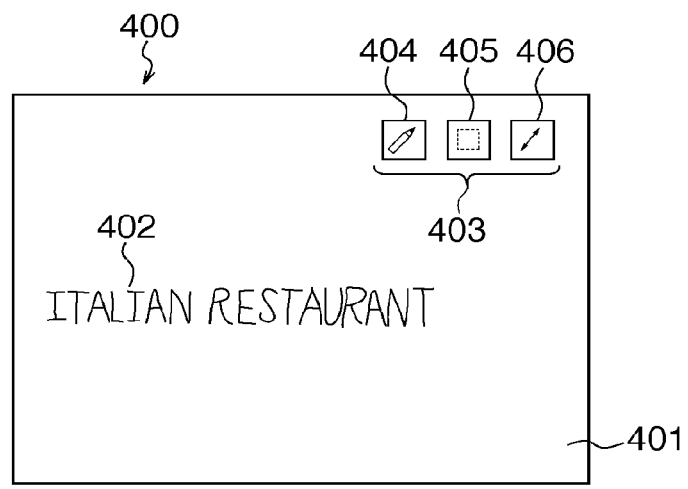
FIGS. 4A to 4C are views showing examples of the display screen.
Figure 4B:
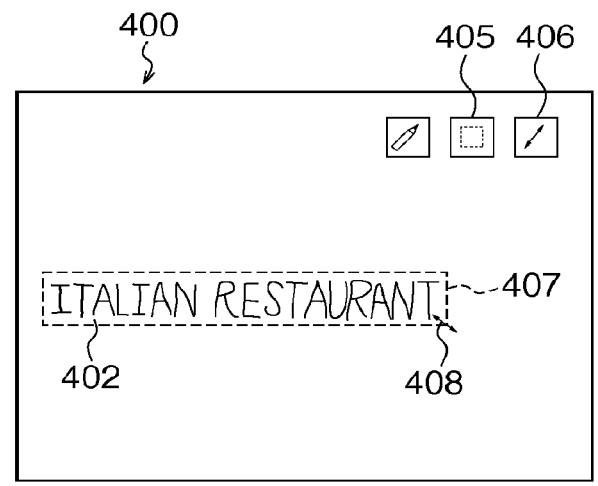
Figure 4C:
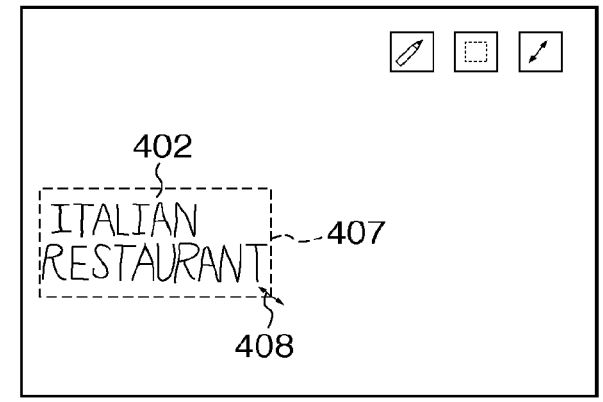

In FIG. 4A, a display area 401 displays handwritten characters 402 obtained by stroke input, and operation icons 403 for changing the operation mode. The operation icons 403 include a pencil icon 404, rectangle icon 405, and shape change icon 406.

When the operator selects the pencil icon 404, the display area 401 can accept a stroke input from him. When the operator selects the rectangle icon 405, the display area 401 can accept an instruction to designate an arbitrary stroke data arrangement area (the display area 401 functions as an area designation means). When the operator selects the shape change icon 406, the display area 401 can accept an instruction to change a designated stroke data arrangement area.

The procedures of an edit operation by the operator to the display screen 400 when the handwritten characters 402 obtained by stroke input are arranged in a changed stroke data arrangement area designated by a change instruction will be described with reference to FIGS. 4A to 4C.

First, the operator selects the pencil icon 404. Then, the display area 401 changes to a state in which a stroke input can be accepted (FIG. 4A). The operator inputs a stroke by designating a position in the display area 401 with a pointing device such as a digitizer pen. In the example of FIG. 4A, the operator inputs strokes to array handwritten characters "ITALIAN RESTAURANT" in line in a predetermined direction.

Upon completion of the stroke input, the operator selects the rectangle icon 405. Then, the display area 401 changes to a state in which an instruction can be accepted to designate a stroke data arrangement area. The operator creates a stroke data arrangement area to contain handwritten characters (the handwritten characters 402 in this case) whose arrangement is to be changed. As a result, a stroke data arrangement area 407 containing the handwritten characters 402 is displayed (FIG. 4B).

Upon completion of designating the stroke data arrangement area 407, the operator selects the shape change icon 406. Then, the display area 401 changes to a state in which the shape of the designated stroke data arrangement area 407 can be changed. An arrow 408 indicating the shape change direction appears (FIG. 4B). The operator designates a shape-changed stroke data arrangement area 407 (FIG. 4C) by operating the arrow 408 indicating the shape change direction, and changing the shape of the stroke data arrangement area 407 to a desired one. As a result, the handwritten characters 402 arranged can be obtained in accordance with the shape-changed stroke data arrangement area 407 (FIG. 4C) (the handwritten characters 402 in FIG. 4C).

5. Sequence of Edit Processing in Display Control Apparatus 101

Figure 5:
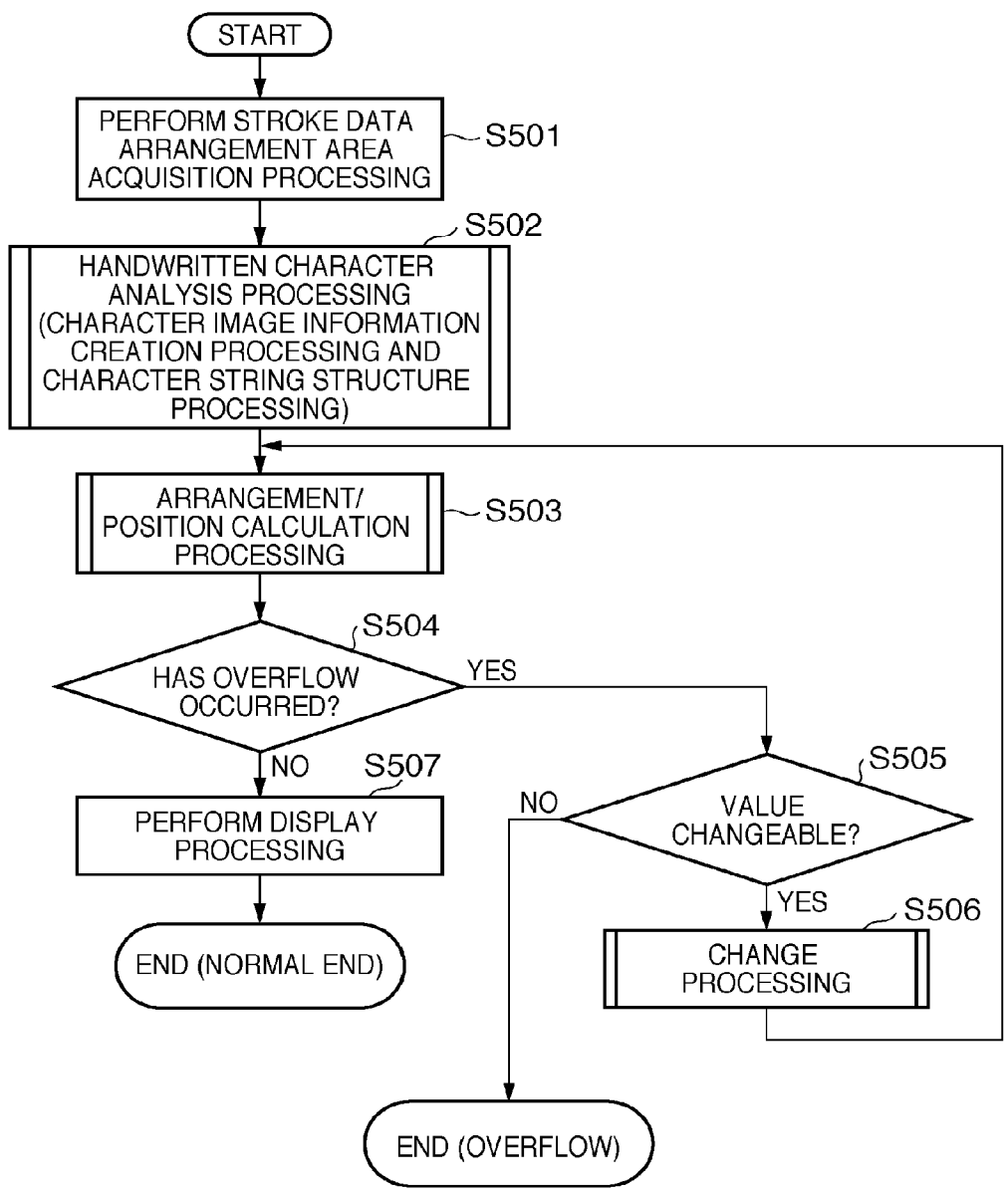
FIG. 5 is a flowchart showing the sequence of edit processing in the display control apparatus 101.

FIG. 5 is a flowchart showing the sequence of edit processing in the display control apparatus 101 when automatically editing the handwritten characters 402 on the display screen 400 displaying the handwritten characters 402 obtained by stroke input. The edit processing in FIG. 5 starts when the operator selects the rectangle icon 405 on the display screen 400.

In step S501, the stroke data arrangement area 407 designated by the operator is acquired.

In step S502, the handwritten characters 402 contained in the stroke data arrangement area 407 acquired in step S501 are analyzed to perform character image information creation processing and character string structure processing. Character image information obtained by the character image information creation processing, and character string structure information obtained by the character string structure processing are registered in the input object list 221 (see FIG. 14). Details of these processes will be described with reference to FIG. 6.

In step S503, the arrangement of circumscribed rectangular areas is determined by referring to the character string structure information so that all the circumscribed rectangular areas containing the images of the handwritten characters 402 acquired in step S502 fall within the acquired stroke data arrangement area 407. The positions of the circumscribed rectangular areas are calculated based on the position rule table 213 to be described in detail with reference to FIG. 15. Details of determination of the arrangement and calculation of the position in step S503 (to be referred to as arrangement/position calculation processing hereinafter) will be described later with reference to FIG. 8.

In step S504, it is determined whether overflow has occurred as a result of arrangement/position calculation processing for the circumscribed rectangular areas in step S503. If it is determined in step S504 that overflow has occurred, the process advances to step S505. If it is determined that no overflow has occurred, the process advances to step S507.

In step S505, it is determined based on the change rule table 212 to be described in detail with reference to FIGS. 13A and 13B whether values in the position rule table 213 or change rule table 212 are changeable. If it is determined in step S505 that these values are changeable, the process proceeds to step S506. If it is determined that these values are not changeable, the process ends owing to the overflow.

In step S506, values in the position rule table 213 or input object list 221 are changed, and the process returns to step S503. Details of the change processing will be described with reference to FIG. 12.

In step S507, character image information and character string structure information in the input object list 221 are acquired to display the images of the handwritten characters 402 represented by the character image information on the display screen 400 based on the acquired character string structure information.

6. Sequence of Character Image Information Creation Processing

Figure 6:
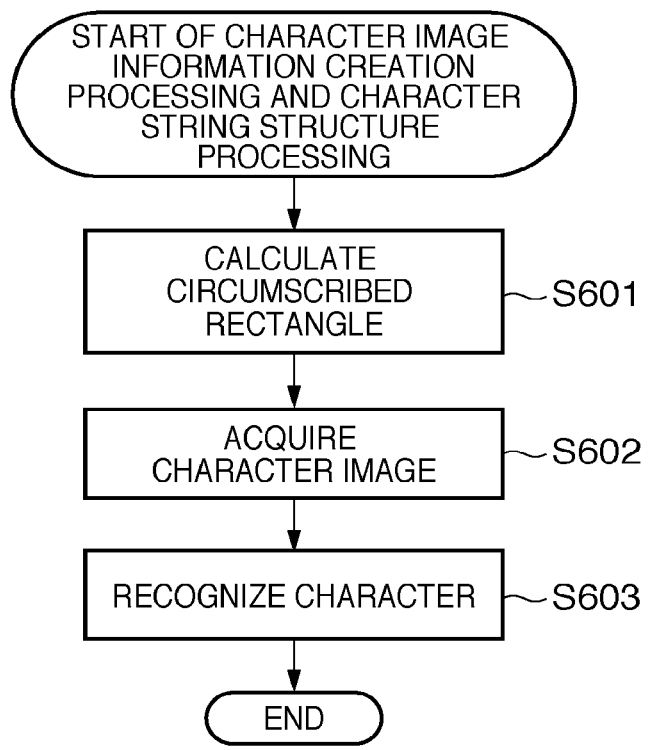
FIG. 6 is a flowchart showing the detailed sequence of character image information creation processing and character string structure processing (step S502 in FIG. 5)

FIG. 6 is a flowchart showing the detailed sequence of character image information creation processing and character string structure processing (step S502 in FIG. 5).

In step S601, a handwritten character obtained by stroke input is extracted to calculate a circumscribed rectangular area representing the character size (width and height). The circumscribed rectangular area calculation processing is performed using an existing character extraction technique. The width, height, and position of the calculated circumscribed rectangular area are registered as character string structure information in the input object list 221.

Figure 7A:
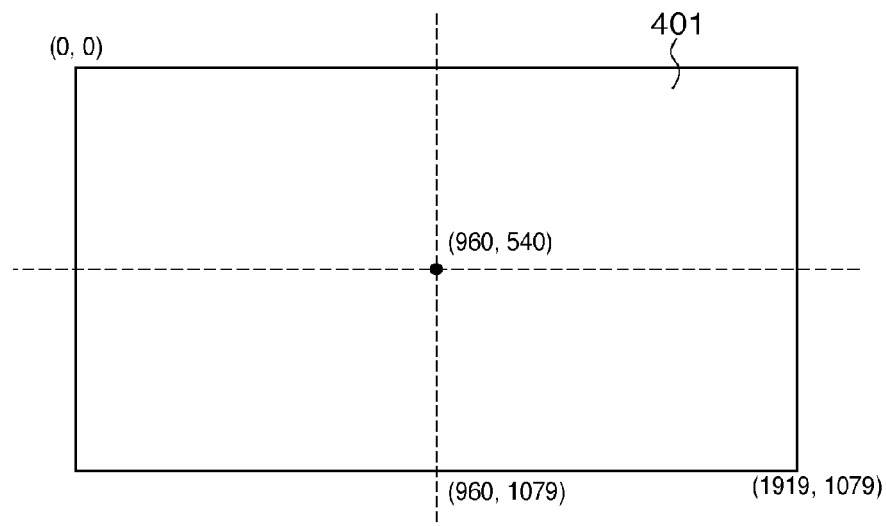
FIGS. 7A and 7B are views showing an example of the result of extracting a handwritten character and calculating a circumscribed rectangular area.
Figure 7B:
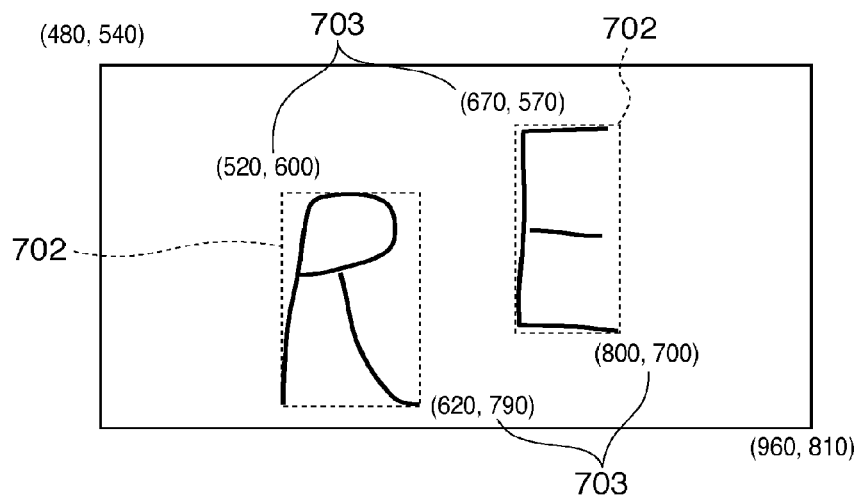

FIGS. 7A and 7B are views showing an example of the result of extracting a handwritten character and calculating a circumscribed rectangular area. In FIG. 7A, reference numeral 401 denotes a display area on the display screen. In FIG. 7B, reference numeral 702 denotes a circumscribed rectangular area of an actually extracted handwritten character. Coordinates 703 are used to specify the circumscribed rectangular area 702.

In step S602, the image of the handwritten character extracted in step S601 is registered as character image information in the input object list 221. The character image information may also be registered as raster graphics, or vector graphics by calculating the outline of a character.

In step S603, the handwritten character extracted in step S601 is recognized. The recognition result in step S603 is registered as character string structure information in the input object list 221. In the example of FIG. 7B, objects displayed in the circumscribed rectangular areas 702 are recognized as "R" and "E", respectively.

In the above description, each character is extracted, that is, a character is processed as an object. However, the present invention is not limited to this, and a word may also be processed as an object. In this case, a character string is recognized using an existing recognition technique to extract a word from the character string. For a European language such as English, a word is extracted by breaking a character string at a space (blank character). For a language using no space break, like Japanese, a word is extracted using a technique such as morphological analysis. Even when a word is processed as an object, a circumscribed rectangular area can be calculated similarly to the case where a character is processed as an object.

By processing a word as an object, line feed (wordwrap) for each word can be executed even in a language in which no line feed is done midway through a word, like English.

7. Sequence of Arrangement/Position Calculation Processing

Figure 8:
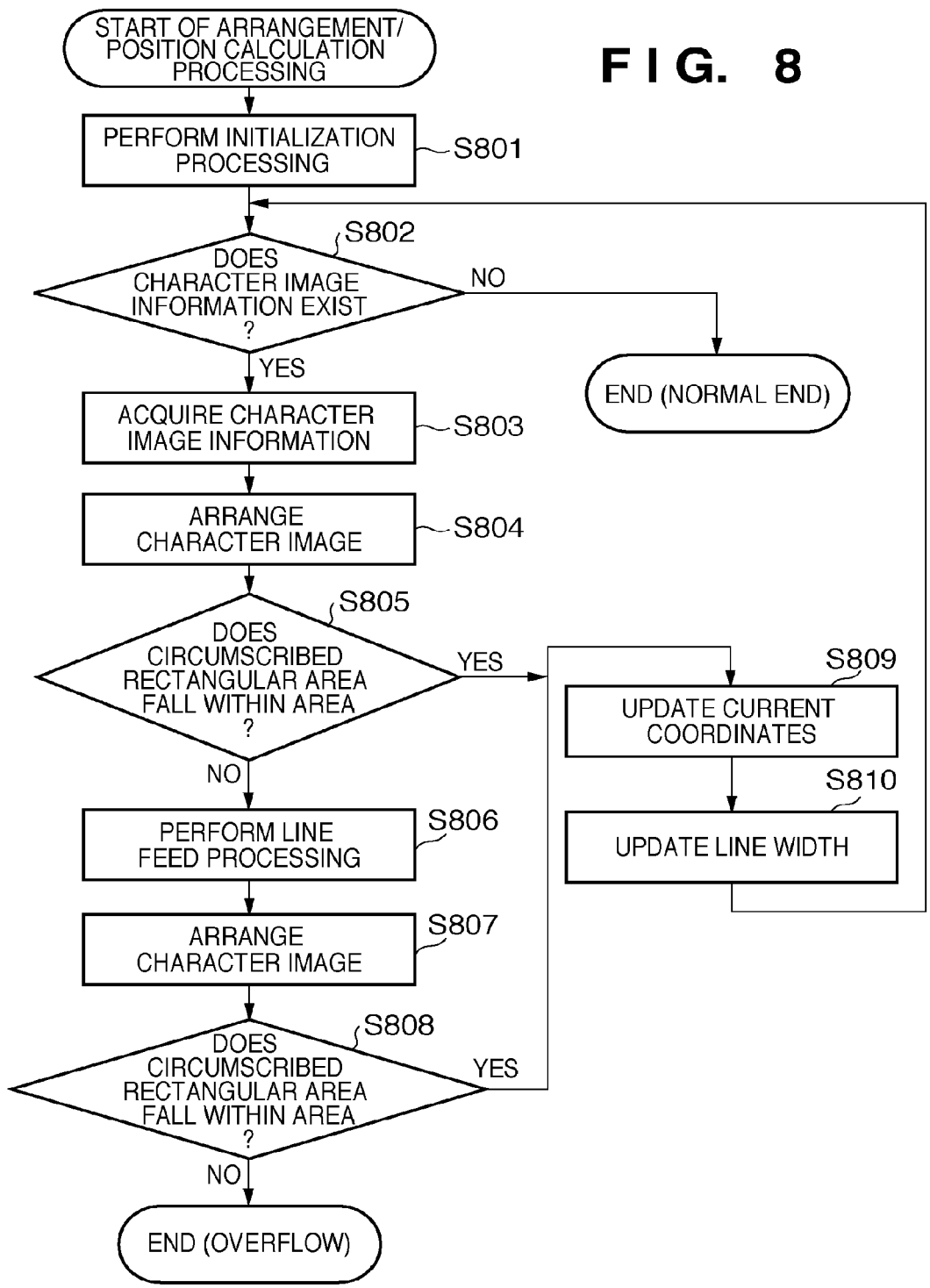
FIG. 8 is a flowchart showing the detailed sequence of arrangement/position calculation processing (step S503 in FIG. 5)

FIG. 8 is a flowchart showing the detailed sequence of arrangement/position calculation processing (step S503 in FIG. 5) in the display control apparatus 101.

In step S801, temporary data is initialized. In the initialization processing, the changed stroke data arrangement area 407 for arranging a circumscribed rectangular area containing a handwritten character image is acquired. Information on the stroke data arrangement area 407 is saved in a temporary data table shown in FIGS. 9A to 9C.

The temporary data table holds an arrangement area 901 for registering the coordinates of an acquired stroke data arrangement area, and current coordinates 902 for registering the coordinates of the upper left corner of a circumscribed rectangular area contained in the stroke data arrangement area. The temporary data table further holds items (a line width 903, line spacing 904, and character spacing 905) for registering the line width, line spacing, and character spacing of a circumscribed rectangular area contained in the stroke data arrangement area.

In the initialization processing, "0" is registered as the line width 903. Values acquired from the position rule table 213 to be described in detail with reference to FIG. 15 are registered as the line spacing 904 and character spacing 905.

In step S802, it is determined whether unprocessed character image information exists in the input object list 221 to be described with reference to FIG. 14. If it is determined that unprocessed character image information exists, the process advances to step S803. If it is determined that no unprocessed character image information exists, the process ends.

In step S803, character string structure information for the unprocessed character image information is acquired from the input object list 221.

In step S804, a circumscribed rectangular area containing a handwritten character image represented by the character image information is arranged in the stroke data arrangement area.

In the arrangement processing, the current coordinates 902 are acquired from the temporary data table shown in FIGS. 9A to 9C. Then, the circumscribed rectangular area is arranged using the current coordinates 902 as the coordinates of the upper left corner of the circumscribed rectangular area containing the handwritten character image represented by the character image information acquired in step S802. An example of the arrangement of the circumscribed rectangular area will be explained with reference to FIGS. 9A and 10. In FIG. 9A, the current coordinates 902 are (300,400).

Figure 10:
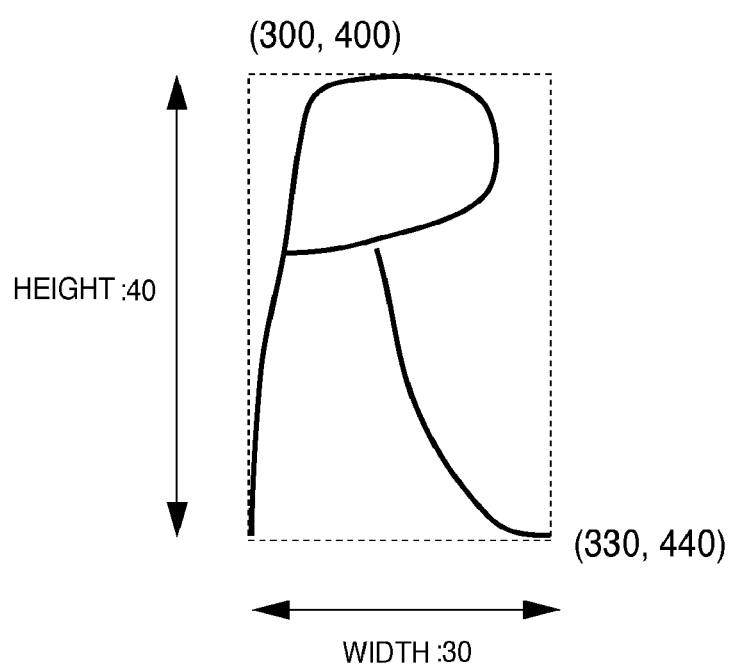
FIG. 10 is a view showing an example of an acquired circumscribed rectangular area.

A case where a circumscribed rectangular area containing a handwritten character image "R" in FIG. 10 is arranged will be described. The circumscribed rectangular area containing the handwritten character image "R" has a width "30" and height "40". As a result of arranging the circumscribed rectangular area, its coordinates are (300,400) at the upper left corner and (330,440) at the lower right corner.

In step S805, it is determined whether the circumscribed rectangular area falls within the stroke data arrangement area acquired in step S801 as a result of the processing in step S803. If it is determined in step S805 that the circumscribed rectangular area falls within the stroke data arrangement area, the process advances to step S809.

In step S809, the current coordinates 902 in the temporary data table are updated. New current coordinates are calculated by adding, to the current coordinates 902, the product of the width of the circumscribed rectangular area calculated in step S803 and the value of the character spacing 905 in the temporary data table.

An example of updating the current coordinates 902 will be explained with reference to FIGS. 9A to 9C and 10. Assume that the coordinates of a circumscribed rectangular area are calculated in step S804 as shown in FIG. 10. In this case, the width of the circumscribed rectangular area is "30", the character spacing is "1.0", and thus the current coordinates 902 in FIG. 9A are updated to those shown in FIG. 9B.

In step S810, the line width in the temporary data table is updated. In the line width updating processing, the line width 903 is acquired from the temporary data table.

It is determined whether the acquired line width is larger than the height of the circumscribed rectangular area. If it is determined that the line width is smaller than the height of the circumscribed rectangular area, the line width in the temporary data table is updated to the value of the height of the circumscribed rectangular area.

If it is determined in step S805 that the circumscribed rectangular area does not fall within the stroke data arrangement area, the process advances to step S806 to perform line feed processing for changing the line feed position. First, the line width 903, the line spacing 904, and an x1-coordinate representing the left end of the arrangement area 901 are acquired from the temporary data table. Then, the current coordinates 902 in the temporary data table are updated. The update value of the x-coordinate of the current coordinates is the acquired x1-coordinate representing the left end of the arrangement area 901 in the stroke data arrangement area 407.

The update value of the y-coordinate of the current coordinates is a value calculated by adding the product of the line width 903 and line spacing 904 to the y-coordinate of the current coordinates before update. After updating the current coordinates, the line width value in the temporary data table is reset to 0.

A concrete example of the line feed processing will be explained with reference to FIGS. 9A to 9C. In the case of FIG. 9A, since the current coordinates 902 are (x,y)=(300, 400), the line width 903 is "40", and the line spacing 904 is "1.0", the y-coordinate of new current coordinates is the old y-coordinate+line width×line spacing=400+40×1.0=440. The x-coordinate of the current coordinates is the same as the x1-coordinate of the stroke data arrangement area, so new current coordinates are (x,y)=(300,440) (FIG. 9C).

In step S807, a circumscribed rectangular area is arranged similarly to the processing in step S804.

In step S808, it is determined whether the circumscribed rectangular area falls within the stroke data arrangement area acquired in step S801 as a result of the processing in step S807. If it is determined that the circumscribed rectangular area falls within the stroke data arrangement area, the process advances to step S809. If it is determined that the circumscribed rectangular area does not fall within the stroke data arrangement area, it is notified as a processing result that an overflow has occurred, and the process ends.

FIGS. 11A to 11E are views showing a state in which the arrangement is determined and the position is calculated by the arrangement/position calculation processing in FIG. 8. As described above, in the arrangement/position calculation processing, circumscribed rectangular areas are arranged in the lateral direction in the stroke data arrangement area so that their upper ends are aligned. When no more circumscribed rectangular area can be arranged in the lateral direction, a line feed is made to execute the same processing. The line feed width is adjusted to the highest circumscribed rectangular area among circumscribed rectangular areas arranged on the line. If no more circumscribed rectangular area can be arranged even upon line feed, the process ends owing to an overflow.

Figure 11A:
FIGS. 11A to 11E are views showing the sequence of arrangement/position calculation processing.
Figure 11B:
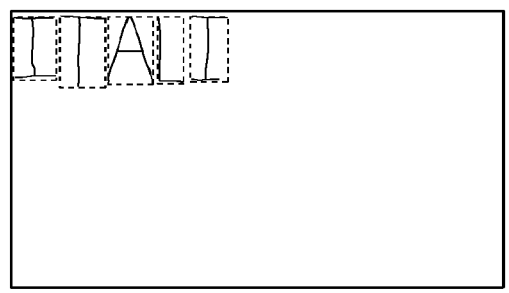

FIG. 11A shows a state after the end of initialization processing step S801, that is, a state in which no circumscribed rectangular area is arranged. A stroke data arrangement area 1101 is designated in the display area 401. FIG. 11B shows a state in which the positions of five characters ("I", "T", "A", "L", and "I") are calculated by repeating the process from steps S802 to S805 five times.

Figure 11C:
Figure 11D:
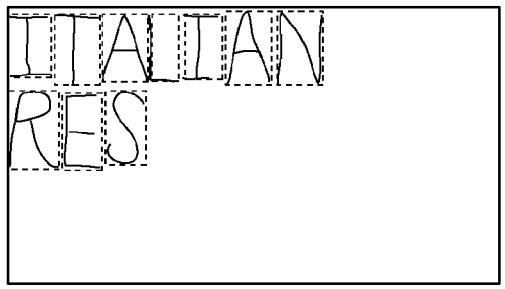

FIG. 11C shows a state in which when circumscribed rectangular areas containing a handwritten character image "R" are arranged, they overflow from the stroke data arrangement area 1101. FIG. 11D shows a state in which circumscribed rectangular areas containing handwritten characters "R", "E", and "S" are arranged by making a line feed to avoid the state in FIG. 11C.

Figure 11E:

FIG. 11E shows a state in which the arrangement and positions of all characters ("I", "T", "A", "L", "I", "A", "N", "R", "E", "S", "T", "A", "U", "R", "A", "N", and "T") have been calculated.

8. Sequence of Change Processing

Figure 12:
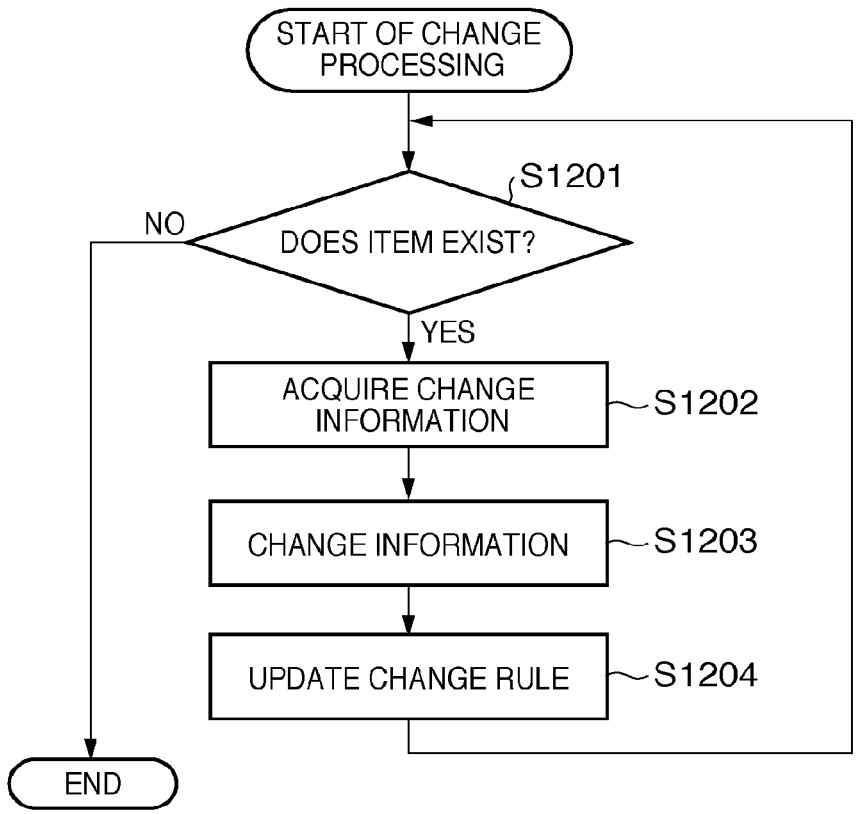
FIG. 12 is a flowchart showing the detailed sequence of change processing (step S506 in FIG. 5)

FIG. 12 is a flowchart showing the detailed sequence of the change processing (step S506 in FIG. 5) in the display control apparatus 101.

In step S1201, it is determined whether changeable items are listed in the change rule table 212 shown in FIGS. 13A and 13B. If it is determined in step S1201 that no changeable item is listed, the process ends. If it is determined that changeable items are listed, the process advances to step S1202.

In step S1202, an item whose data is to be changed is determined from priority 1301 in the change rule table 212 shown in FIGS. 13A and 13B. In FIG. 13A, a change item having priority "1" is "character image", so it is determined to change a handwritten character image (in this case, a smaller priority value represents a higher priority level).

In step S1203, the value of the item determined in step S1202 is changed. The change processing is done based on a change rate 1303 in the change rule table 212 shown in FIGS. 13A and 13B. If the change item is "character image", the value in the input object list 221 is updated.

If the change item is "line spacing" or "character spacing", the value in the position rule table 213 is updated. The case in FIG. 13A will be exemplified. Since the change item is "character image" and the change rate is 2%, the values of a character width 1402 and character height 1403 in the input object list 221 are decreased by 2%.

The handwritten character image is reduced in accordance with the decreased character width and character height. The handwritten character image is reduced using an existing image reduction technique. In this manner, when the change item is "character image", a handwritten character image is reduced. When the change item is "line spacing" or "character spacing", the spacing between handwritten character images is narrowed.

In step S1204, a current value 1304 in the change rule table 212 shown in FIGS. 13A and 13B is decreased by the change rate 1303. If the decreased current value 1304 equals a minimum value 1305, an item whose value has reached the minimum value is deleted from the change rule table 212.

In the example of FIG. 13A, the current value 1304 is "100%", the change rate 1303 is "2%", and thus the new current value is "98%" (FIG. 13B).

9. Structure of Change Rule Table

FIGS. 13A and 13B are tables showing an example of the change rule table 212 in the display control apparatus 101. The change rule table 212 includes the priority 1301, a change item 1302 representing the contents of a change, the change rate 1303 representing the change amount, the current value 1304, and the minimum value 1305.

The priority 1301 represents the priority of a change item. As the value is smaller, the priority is higher. The change item 1302 represents an item whose value is to be changed.

The change rate 1303 represents the rate of change. For example, when the change rate is "2%", the value of a change item is decreased by 2%.

The current value 1304 represents a value decreased from an initial value. For example, when the current value is "75%", this means that the value decreases from the initial value to "75%".

The minimum value 1305 represents a minimum value to which the value can be decreased. For example, when the minimum value is "50%", the value is permitted to be decreased up to half the initial value.

10. Structure of Input Object List

FIG. 14 shows an example of the input object list 221 used in the display control apparatus 101. The input object list 221 includes an input character 1401 serving as character string structure information, the character width 1402, the character height 1403, a character position 1404, and character image information 1405.

The input character 1401 represents a result of recognizing a handwritten character. The character width 1402 represents the width of a circumscribed rectangular area containing a handwritten character image. The character height 1403 represents the height of a circumscribed rectangular area containing a handwritten character image.

The character position 1404 represents coordinates for specifying the circumscribed rectangular area of a handwritten character. The character position 1404 is defined by the coordinates of the upper left and lower right corners of a circumscribed rectangular area. For example, a handwritten character image "I" is a circumscribed rectangular area defined by (x1,y1)=(300,400) and (x2,y2)=(330,440).

The character image information 1405 is a handwritten character image. The handwritten character image may also be held as raster graphic data, or vector graphic data by calculating the outline of a character. The handwritten character image may also undergo compression or the like.

Character string information is represented in the order along the line. In the example of FIG. 14, a character string "ITALIAN RES . . . " is expressed. The result of character recognition is represented as a character string, but another representation is also available as long as the order of handwritten character images is expressed.

In other words, the processing in the first embodiment can be achieved as long as the order of handwritten character images can be held without performing character recognition. Even when character recognition fails, the arrangement of handwritten character images can be changed in accordance with the shape of the stroke data arrangement area. For example, even when symbols such as ○ and Δ are handwritten and input, the first embodiment can be implemented as long as pieces of character image information representing ○ and Δ and the order of these pieces of character image information are held.

11. Structure of Position Rule Table

FIG. 15 shows an example of the position rule table 213 in the first embodiment. The position rule table 213 includes a line spacing 1501 and character spacing 1502.

The line spacing 1501 represents a spacing in line feed. A value "1.0" represents a state in which adjacent lines do not overlap each other. As the value decreases, the line spacing narrows.

The character spacing 1502 represents a spacing between characters. A value "1.0" represents a state in which adjacent characters do not overlap each other. As the value decreases, the spacing between characters narrows.

In this case, the line spacing and character spacing are set, but rules such as Japanese word wrapping at the beginning and end of a line may also be applied to characters recognized from handwritten character images.

As is apparent from the above description, according to the first embodiment, when the operator designates a stroke data arrangement area, handwritten character images displayed in the area are extracted, and rectangular areas circumscribing the handwritten character images are calculated.

When no circumscribed rectangular area falls within the stroke data arrangement area as a result of changing the stroke data arrangement area, the arrangement of the circumscribed rectangular areas can be changed to fall within the stroke data arrangement area.

When an overflow cannot be prevented by only changing the arrangement, it can be done by changing the size of a handwritten character image or the spacing between circumscribed rectangular areas.

That is, even a handwritten character, figure, and the like can be automatically edited in synchronism with the stroke data arrangement area.

Other Embodiments

The present invention may also be applied to a system including a plurality of devices (for example, a host computer, interface device, reader, and printer), or an apparatus (for example, a copying machine or facsimile apparatus) formed by a single device.

The object of the present invention is also achieved by supplying, to a system or apparatus, a recording medium which records software program codes for implementing the functions of the above-described embodiment. In this case, these functions are achieved by reading out and executing the program codes recorded on the recording medium by the computer (or the CPU or MPU) of the system or apparatus. In this case, the recording medium which records the program codes constitutes the present invention.

The recording medium for supplying the program codes includes a floppy® disk, hard disk, optical disk, magneto-optical disk, CD-ROM, CD-R, magnetic tape, nonvolatile memory card, and ROM.

The present invention is not limited to a case where the functions of the above-described embodiment are implemented when the computer executes the readout program codes. Also, the present invention includes a case where an OS (Operating System) or the like running on the computer performs some or all of actual processes based on the instructions of the program codes and thereby implements the functions of the above-described embodiment.

Furthermore, the present invention includes a case where the functions of the above-described embodiment are implemented after the program codes read out from the recording medium are written in the memory of a function expansion board inserted into the computer or the memory of a function expansion unit connected to the computer. That is, the present invention also includes a case where after the program codes are written in the memory, the CPU of the function expansion board or function expansion unit performs some or all of actual processes based on the instructions of the program codes and thereby implements the functions of the above-described embodiment.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-186328 filed on Jul. 17, 2007, which is hereby incorporated by reference herein in its entirety.

What is claimed is:

1. A display control apparatus which controls display on a display screen, comprising:
    an input data analysis unit configured to, in the case that a user designates an area on the display screen, recognize the area and a first shape of the area, to extract images of respective handwritten characters displayed in the area recognized by said input data analysis unit, and to calculate circumscribed rectangular areas circumscribing the respective handwritten characters;
    a change rule table that holds a rule of adjust width for changing character spacing and line spacing, wherein the adjust width is changeable, and wherein (a) when the character spacing is changed according to the adjust width, a ratio of the respective character spacing between the handwritten characters is maintained, and (b) when the line spacing is changed according to the adjust width, a ratio of the respective line spacing between the handwritten characters is maintained;
    a calculation unit configured to, in the case that the first shape of the area is transformed to a different second shape by the user and at least part of the circumscribed rectangular areas is determined not to fall within the second shaped area, determine an arrangement of the circumscribed rectangular areas over changing at least one of respective line spacing and respective character spacing based on a range of the adjust width of the rule held by said change rule table so as to make all of the circumscribed rectangular areas fall within the second shaped area, and calculate positions of the circumscribed rectangular areas in the second shaped area; and
    a display unit configured to display the images of the handwritten characters at the positions calculated by said calculation unit.

2. The apparatus according to claim 1, wherein
    the handwritten characters are arrayed in a predetermined direction to form a line, and
    said calculation unit changes a line feed position for the circumscribed rectangular areas calculated by said input data analysis unit, thereby determining the arrangement of the circumscribed rectangular areas to fall within the second shaped area.

3. The apparatus according to claim 2, further comprising a position rule holding unit configured to hold information on a position rule which defines a spacing between adjacent circumscribed rectangular areas,
    wherein said calculation unit calculates the positions of the circumscribed rectangular areas based on the information on the position rule.

4. The apparatus according to claim 1, further comprising:
    a change rule holding unit configured to hold information on a change rule which defines a change rate when changing sizes of the images of the handwritten characters and a change rate when changing a spacing between adjacent circumscribed rectangular areas; and
    a change unit configured to, when said calculation unit cannot determine the arrangement of the circumscribed rectangular areas, change sizes of the images of the handwritten characters based on the information on the change rule so as to make the circumscribed rectangular areas fall within the second shaped area.

5. The apparatus according to claim 4, wherein the information on the change rule includes a change rate when changing the sizes of the images of the handwritten characters and a change rate when changing the spacing between the adjacent circumscribed rectangular areas.

6. The apparatus according to claim 4, wherein the change rule defines an order of priority for changing items, and said changing unit changes the size of the images of the respective handwritten characters or the spacing between adjacent circumscribed rectangular areas based on the order of priority defined in the change rule held by said change rule holding unit.

7. A display control method implemented by a display control apparatus which controls display on a display screen, comprising:
    a first recognition step of recognizing, in the case that a user designates an area on the display screen, the area and a first shape of the area;
    an extraction step of extracting images of respective handwritten characters displayed in the area recognized in the first recognition step, and calculating circumscribed rectangular areas circumscribing the respective handwritten characters;
    a holding step of holding a rule of adjust width for changing character spacing and line spacing, wherein the adjust width is changeable, and wherein (a) when the character spacing is changed according to the adjust width, a ratio of the respective character spacing between the handwritten characters is maintained, and (b) when the line spacing is changed according to the adjust width, a ratio of the respective line spacing between the handwritten characters is maintained;
    a calculation step of, in the case that the first shape of an area is transformed to a different second shape by the user and at least part of the circumscribed rectangular areas calculated in the extraction step is determined not to fall within the second shaped area, determining an arrangement of the circumscribed rectangular area over at least one of changing respective line spacing and respective character spacing based on a range of the adjust width of the rule held in said holding step so as to make all of the circumscribed rectangular areas fall within the second shaped area, and calculating positions of the circumscribed rectangular areas in the second shaped area; and
    a display step of displaying on the display screen the images of the handwritten characters at the positions calculated in the calculation step,
    wherein at least one of the steps is implemented using a processor.

8. A non-transitory computer-readable storage medium storing a control program for causing a computer to execute a display control method defined in claim 7.

* * * * *